United States Patent
Mishra et al.

(10) Patent No.: US 10,125,302 B2
(45) Date of Patent: Nov. 13, 2018

(54) SELF-HEALING CEMENT COMPRISING POLYMER CAPABLE OF SWELLING IN GASEOUS ENVIRONMENT

(71) Applicant: HALLIBURTON ENERGY SERVICES, INC., Houston, TX (US)

(72) Inventors: Vaishali Mishra, Pune (IN); Sunita Sameer Kadam, Pune (IN); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/506,217

(22) PCT Filed: Sep. 29, 2014

(86) PCT No.: PCT/US2014/058030
§ 371 (c)(1),
(2) Date: Feb. 23, 2017

(87) PCT Pub. No.: WO2016/053237
PCT Pub. Date: Apr. 7, 2016

(65) Prior Publication Data
US 2018/0037798 A1    Feb. 8, 2018

(51) Int. Cl.
*E21B 33/13* (2006.01)
*C04B 28/02* (2006.01)
(Continued)

(52) U.S. Cl.
CPC .............. *C09K 8/44* (2013.01); *C04B 26/06* (2013.01); *C04B 28/02* (2013.01); *C08F 220/34* (2013.01);
(Continued)

(58) Field of Classification Search
CPC ......... E21B 33/13; C04B 28/02; C09K 8/467; C09K 8/42
See application file for complete search history.

(56) References Cited

U.S. PATENT DOCUMENTS 5,009,269 A    4/1991  Moran et al.
7,647,970 B2   1/2010  Mueller et al.
(Continued)

FOREIGN PATENT DOCUMENTS

EP    2025732    2/2009
EP    2199539    6/2010
(Continued)

OTHER PUBLICATIONS

PCT International Search Report and Written Opinion, dated May 26, 2015, Appl No. PCT/US2014/058030, "Self-Healing Cement Comprising Polymer Capable of Swelling in Gaseous Environment," Filed Sep. 29, 2014, 14 pgs.
(Continued)

*Primary Examiner* — Catherine Loikith
(74) *Attorney, Agent, or Firm* — Craig W. Roddy; Tumey L.L.P.

(57) ABSTRACT

A method of treating a subterranean formation includes introducing cement composition into a wellbore, the cement composition including a pumpable slurry of cement comprising a copolymer capable of swelling in a gaseous environment. A composition includes a pumpable slurry of cement comprising a copolymer capable of swelling in a gaseous environment.

17 Claims, 6 Drawing Sheets

(51) Int. Cl.
    *C09K 8/467*     (2006.01)
    *C09K 8/42*     (2006.01)
    *C09K 8/44*     (2006.01)
    *C09K 8/473*     (2006.01)
    *C04B 26/06*     (2006.01)
    *C08F 220/34*     (2006.01)
    *E21B 33/14*     (2006.01)

(52) U.S. Cl.
    CPC .............. *C09K 8/473* (2013.01); *E21B 33/14* (2013.01); *E21B 33/13* (2013.01)

(56) References Cited

U.S. PATENT DOCUMENTS

| | | |
|---|---|---|
| 7,934,554 B2 | 5/2011 | Roddy |
| 2007/0137528 A1 | 6/2007 | Roy-Delage et al. |
| 2007/0204765 A1 | 9/2007 | Le Roy-Delage et al. |
| 2009/0320720 A1 | 12/2009 | Roddy et al. |
| 2011/0120715 A1* | 5/2011 | Le Roy-Delage ............ C04B 24/2652 166/292 |
| 2013/0000900 A1 | 1/2013 | Kalgaonkar et al. |
| 2013/0075096 A1* | 3/2013 | Khalfallah .......... C04B 24/2652 166/294 |
| 2013/0146286 A1 | 6/2013 | Le Roy-Delage et al. |
| 2014/0060836 A1 | 3/2014 | Daou et al. |
| 2014/0110114 A1* | 4/2014 | Daou ................... E21B 33/14 166/293 |

FOREIGN PATENT DOCUMENTS

| | | |
|---|---|---|
| EP | 2457974 | 5/2012 |
| EP | 2615151 | 7/2013 |
| EP | 2578622 | 10/2013 |

OTHER PUBLICATIONS

Bonner, David C., "Solubility of Supercritical Gases in Polymers-A Review," Polymer Engineering and Science, Feb. 1977, vol. 17, No. 2.

Search Report for Danish Application No. PA 2017 00156 dated Dec. 5, 2017.

* cited by examiner

SELF-HEALING CEMENT COMPRISING POLYMER CAPABLE OF SWELLING IN GASEOUS ENVIRONMENT

BACKGROUND

Cementing is a common well operation. For example, hydraulic cement compositions can be used in cementing operations in which a string of pipe, such as casing or liner, is cemented in a wellbore. The cemented string of pipe isolates different zones of the wellbore from each other and from the surface. Hydraulic cement compositions can be used in primary cementing of the casing or in completion operations. Hydraulic cement compositions can also be utilized in intervention operations, such as in plugging highly permeable zones or fractures in zones that may be producing too much water, plugging cracks or holes in pipe strings, and the like.

In performing cementing, a hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The cement composition is allowed time to set in the annular space, thereby forming an annular sheath of hardened, substantially impermeable cement. The hardened cement supports and positions the pipe string in the wellbore and bonds the exterior surfaces of the pipe string to the walls of the wellbore.

Hydraulic cement is a material that when mixed with water hardens or sets over time because of a chemical reaction with the water. Because this is a chemical reaction with the water, hydraulic cement is capable of setting even under water. The hydraulic cement, water, and any other components are mixed to form a hydraulic cement composition in the initial state of a slurry, which should be a fluid for a sufficient time before setting for pumping the composition into the wellbore and for placement in a desired downhole location in the well.

For effective zonal isolation, the cement must be a continuous sheath that does not allow any leakage. Sometime, the set cement forms cracks due to physical stresses caused by change in pressure or temperature, chemical attack, formation creep and other reasons. Most self-healing cements include materials that swell when they come in contact with liquids such as oil and water. However, they do not swell in the presence of gases such as hydrocarbons, hydrogen sulfide and $CO_2$.

Accordingly, an ongoing need exists for a self-healing cement that is capable of swelling in gaseous environments.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention relates to adaptive cement systems. In particular, the invention relates to cement systems which are "self-healing", i.e. system which can adapt to compensate for changes or faults in the physical structure of the cement, or which adapt their structure after the setting phase of the cement in the cementing of oil, gas, water or geothermal wells, or the like.

Zonal isolation may be achieved by using a self-adaptive cement system which includes cement, water and at least one additive that reacts or/and expands when comes in contact with gaseous environment such as carbon dioxide or acidic solution of HCl or $H_2S$. Gaseous environments include the presence of gas and water, such as those conditions found in acidic and corrosive environments. These additives have the effect of making the cement self-healing in the event of physical failure or damage such as microannuli. Moreover such materials can also protect the casing from the corrosion due to acid attack.

$CO_2$ can ionize an amine containing polymer. When $CO_2$ comes in contact with water it forms carbonic acid which dissociates into $HCO_3^-$ and $H^+$ ions that interact with amine groups in the repeat units to form ammonium bicarbonates. This invention discloses a polymer composition which swells in $CO_2$, HCl and $H_2S$ even at low temperatures (75° F.) and pressures (700 psi). In addition, it may provide strength to the set cement due to presence of a co-monomer such as a styrene co-monomer.

An amine group containing polymer is also capable of interacting with HCl and $H_2S$. This may be because an amine group present in polymer backbone acts as a chemical base. They have a tendency to neutralize acids to form salts and water. In one embodiment, styrene monomer may be added in the polymer to make the final copolymer free flowing and impart strength to the cement sheath.

In some embodiments, the invention is related to a method comprising: introducing a well cementing composition into a wellbore, said cementing composition including a pumpable slurry of cement comprising a copolymer capable of swelling in a gaseous environment, wherein the gaseous environment comprises at least one of $CO_2$, $H_2S$, HCl gas, and combinations thereof, and allowing at least a portion of the cementing composition to cure, with the proviso that the copolymer does not include a fluoro-based polymer. The copolymer may include at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, styrene, N,N' dimethylaminoethyl methacrylate (DMAEMA), ethylene glycol dimethacrylate (EGDMA), methyl methacrylate (MMA), polypropylene, tri vinyl monomers, and combinations thereof. The gaseous environment may include at least one of $H_2S$, HCl gas, and combinations thereof. The copolymer may include styrene in the amount of about 5% to about 25% by weight. The copolymer may include DMAEMA in the amount of about 75% to about 95% by weight. The copolymer(cross-linker) may include EGDMA in the amount of about 1% to about 3% by weight. The method may further comprise allowing the cured cement to self-heal to compensate for changes or faults in the physical structure of the cement after the setting phase of the cement composition. The self-healing may include swelling in a gaseous environment, thereby blocking the migration of fluids, gases, and combinations thereof. The changes or faults may be cracks due to physical stresses, chemical attack, formation creep, and combinations thereof.

Several embodiments of the invention are directed to a cementing system including an apparatus configured to: place a cement composition in a wellbore, said cement composition comprising: a pumpable slurry of cement comprising a copolymer capable of swelling in a gaseous environment, wherein the gaseous environment comprises at least one of $CO_2$, $H_2S$, HCl gas, and combinations thereof; and allow at least a portion of the cement composition to set, wherein the cement composition adapts to compensate for changes or faults in the physical structure of the cement after the setting phase of at least a portion of the cement composition, with the proviso that the copolymer does not include a fluoro-based polymer. The cement composition may adapt its structure after the setting phase of at least a portion of the cement. The cement composition may adapt itself by self-healing. The self-healing may include swelling in a gaseous environment, thereby blocking the migration of fluids, gases, and combinations thereof. The gaseous environment may include at least one of $H_2S$, HCl gas, and combinations thereof The changes or faults may be cracks due to physical stresses, chemical attack, formation creep, and combinations thereof. The copolymer may include at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylatestyrene, DMAEMA, EGDMA, methyl methacrylate (MMA), polypropylene, tri vinyl monomers, and combinations thereof.

Certain embodiments of the invention are directed to a composition for well cementing including a pumpable slurry of cement comprising a copolymer capable of swelling in a gaseous environment, wherein the gaseous environment comprises at least one of $CO_2$, $H_2S$, HCl gas, and combinations thereof. The copolymer may include at least two of the following co-monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylatestyrene, DMAEMA, EGDMA, methyl methacrylate (MMA), polypropylene, tri vinyl monomers, and combinations thereof. The gaseous environment may include at least one of $H_2S$, HCl gas, and combinations thereof. The copolymer may include styrene in the amount of about 5% to about 25% by weight. The copolymer may include DMAEMA in the amount of about 75% to about 95% by weight.

Aqueous Base Fluids

The cement slurry may include an aqueous base fluid from any source, provided that the fluids do not contain components that might adversely affect the stability and/or performance of the treatment fluids of the present invention. The aqueous base fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In certain embodiments, the water may be present in the cement composition in an amount of from about 20% to about 95% by weight of cement composition, from about 28% to about 90% by wt. of cement composition, or from about 36% to about 80% by wt. of cement composition.

Cementitious Materials

A variety of cements can be used in the present invention, including cements comprised of calcium, aluminum, silicon, oxygen, and/or sulfur which set and harden by reaction with water. Such hydraulic cements include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III. The cementitious materials may be combined with the aqueous base fluids to form a cement slurry.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 8 ppg to about 18 ppg, or from about 9 ppg to about 17 ppg.

Swelling Copolymers

Generally, the polymers useful in the invention will be ones that swell in the presence of gaseous hydrocarbons (such as methane, ethane and natural gas, which are non-limiting examples), hydrogen sulfide, carbon dioxide, carbonic acid and/or hydrochloric acid. By "swell," "swelling" or "swellable" it is meant that the polymer increases its volume upon exposure to gaseous hydrocarbon, hydrogen sulfide, carbon dioxide, carbonic acid and/or hydrochloric acid, typically such that the resulting volume is greater than would be expected by mere linear addition of the polymer volume and the volume of gaseous hydrocarbon, hydrogen sulfide and/or carbon dioxide. Often the swelling can result in at least a 10% increase in the polymer volume and can result in at least a 13% increase, at least a 20% increase, or at least a 30% increase in the polymer volume. Preferably, the polymer will be a carbon dioxide swellable polymer meaning that it at least swells upon exposure to carbon dioxide but can also swell upon exposure to hydrocarbons, hydrogen sulfide, carbonic acid and/or hydrochloric acid.

Polymers useful in the invention may include carbon dioxide swellable polymers that are swellable in carbon dioxide at a temperature below 250° C. and at a pressure below 1000 bar. Generally, useful polymers can be swellable in carbon dioxide at temperatures below 200° C., below 150° C. or below 100° C. and at a pressure below 700 bar, below 500 bar or below 100 bar.

Monomer pairs may be used to make the copolymers of the invention. The monomers useful in the invention do not include fluoro-based monomers. Examples of mono-vinyl monomers include alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate.

Examples of di-vinyl monomers include alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, and allyl acrylate.

Examples of tri-vinyl monomers include triacrylate (trimethylolpropane triacrylate) and trimethacrylate (trimethylolpropane trimethacrylate)

A mono-vinyl monomer may be combined with a di-vinyl monomer to make the copolymers of the invention. Mono-vinyl monomers can copolymerized with multi-vinyl monomers such as divinyl monomers or trivinyl monomers to yield cross-linked polymers.

Copolymer Synthesis

In an illustrative embodiment, a cross-linked copolymer comprising N,N-Dimethylaminoethyl Methacrylate (DMAEMA) and styrene was synthesized in bulk polymerization technique using azobisisobutyronitrile (AIBN) as a free radical initiator. One reason for selecting DMAEMA is that it contains amino functional group which can interact with carbonic acid and swells due to protonation of t-amine group and polar group (acrylate group) that exhibits strong intra-molecular repulsion (low cohesive energy). DMAEMA has a tertiary amine group which is stable in nature. EGDMA is a cross-linker, and it is miscible with the DMAEMA and styrene monomer.

Figure 1:
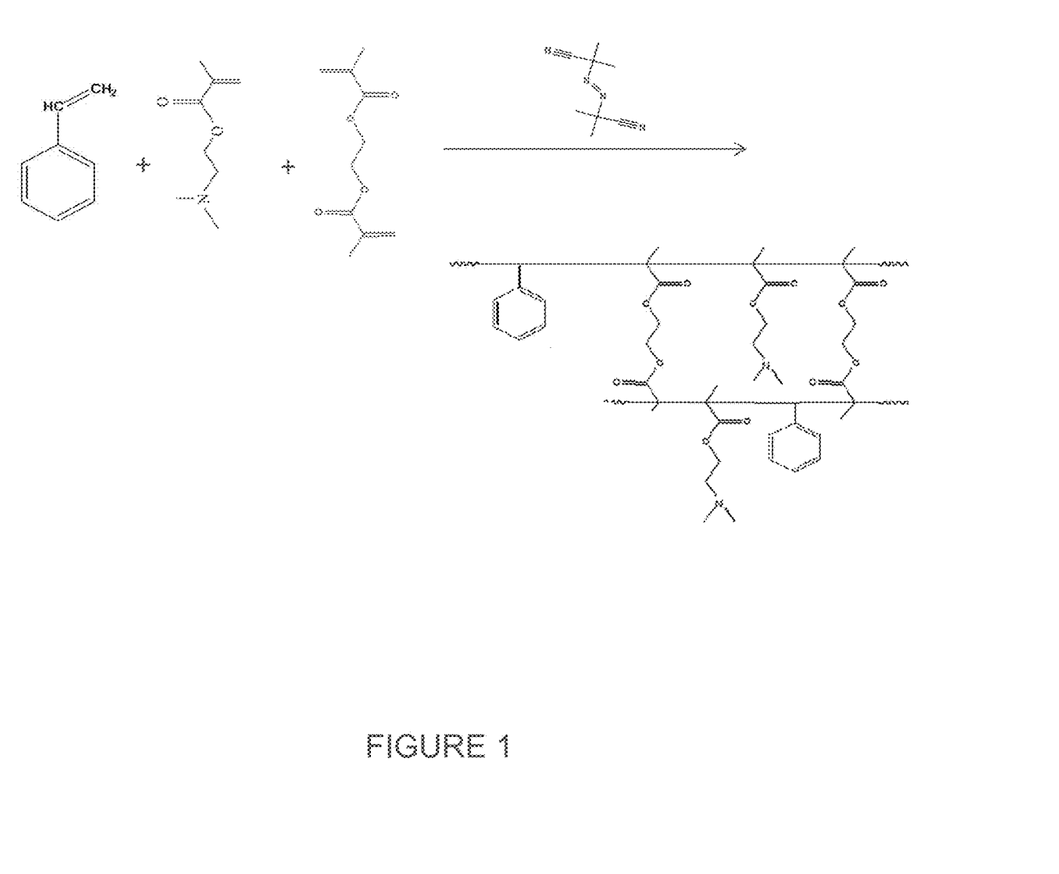
FIG. 1 is a schematic representation of polymer synthesis according to embodiments of the invention.

A schematic representation of copolymer synthesis is shown in FIG. 1.

The co-monomer composition of the polymer can be altered to vary the swelling rate and the extent of swelling. To achieve this, various co-monomer(s) can be incorporated. In several embodiments, a mono-vinyl monomers may be combined with a di-vinyl monomer or trivinyl monomers to make the copolymers of the invention.

Figure 4:
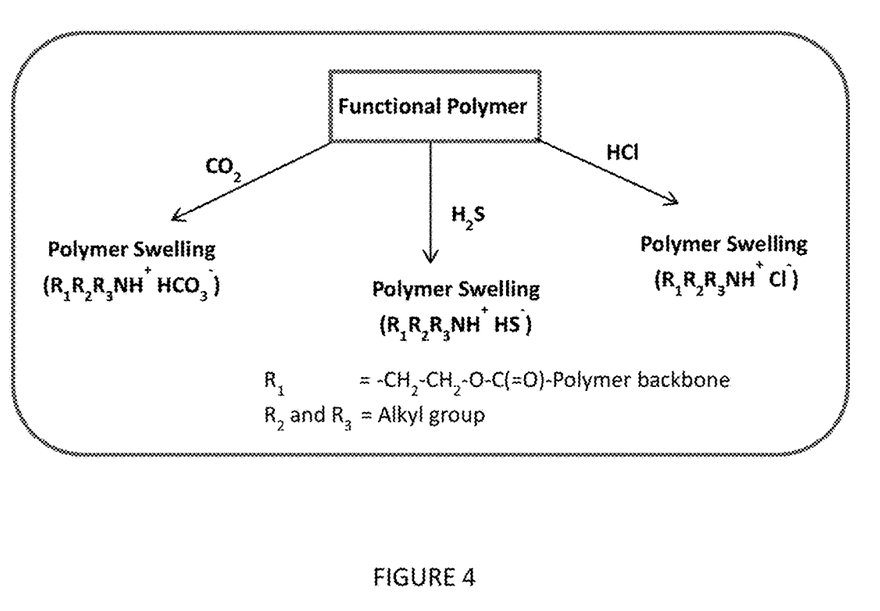
FIG. 4 is a schematic diagram of the interaction of different gases with a synthesized copolymer made according to embodiments of the invention.

The crosslinked polymers of the invention may also swell in the presence of acid solutions of $H_2S$. The schematic diagram in FIG. 4 shows the interaction of the polymers of the invention with different gaseous environments including $CO_2$, $H_2S$, and HCl.

In one embodiment, a copolymer pair includes styrene and DMAEMA, with EGDMA added as a crosslinker. Various substitutions may be made to form different copolymer pairs. In an embodiment, styrene may be substituted with MMA, polypropylene, and other vinyl polymers. In another embodiment, DMAEMA can be substituted with amino group containing monomers. In some embodiments, EGDMA can be substituted with other divinyl and trivinyl monomers as a cross-linker depending on the extent of crosslinking required.

In exemplary copolymer pairs, the amount of styrene may range from about 5 to about 25 mole % with a preferred range of about 15 to about 20 mole %. The amount of DMAEMA may range from about 75 to about 95 mole % with a preferred range of about 80 to about 85 mole %. The amount of EGDMA or other crosslinker may range from about 1 to about 3 mole % with a preferred amount of about 2 mole %.

The copolymer may be included in the cement composition in an amount sufficient to seal cracks that may form from physical and thermal stresses and chemical attack in the set or cured cement composition. That is, the polymer should be present in the set cement composition such that exposure to carbon dioxide, hydrogen sulfide, gaseous hydrocarbons, carbonic acid, or hydrochloric acid will cause it to swell sufficiently to seal cracks or holes that have been introduced in to the set or cured cement. Typically such cracks or holes are introduce by physical stresses but could be caused by other events. By way of example, the polymer can be present in the cement composition in an amount in the range of from about 0.1% to about 50% by weight of the cement on a dry basis ("bwoc") (e.g., 0.5%, 1%, 5% bwoc, 10% bwoc, 15% bwoc, 20% bwoc, etc.). In certain embodiments, the polymer can be present in the cement composition in an amount in the range of from about 2% to about 40% bwoc, may be present in the range of 5% to 30% bwoc and can be present in the range of from 10% to 25% bwoc.

Cement Additives

The cement compositions of the invention may contain additives. In certain embodiments, the additives comprise at least one of resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

As will be appreciated by those of ordinary skill in the art, embodiments of the cement compositions of the present invention may be used in a variety of subterranean applications, including primary and remedial cementing. For example, a cement slurry composition comprising cement, a polymer, and water may be introduced into a subterranean formation and allowed to set or cure therein. In certain embodiments, for example, the cement slurry composition may be introduced into a space between a subterranean formation and a pipe string located in the subterranean formation. Embodiments may further comprise running the pipe string into a wellbore penetrating the subterranean formation. The cement slurry composition may be allowed to set or cure to form a hardened mass in the space between the subterranean formation and the pipe string. In addition, a cement composition may be used, for example, in squeeze-cementing operations or in the placement of cement plugs. Embodiments of the present invention further may comprise producing one or more hydrocarbons (e.g., oil, gas, etc.) from a well bore penetrating the subterranean formation.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 6, the disclosed cement compositions may directly or indirectly affect one or more components or pieces of equipment associated with an exemplary wellbore drilling assembly 100, according to one or more embodiments. It should be noted that while FIG. 6 generally depicts a land-based drilling assembly, those skilled in the art will readily recognize that the principles described herein are equally applicable to subsea drilling operations that employ floating or sea-based platforms and rigs, without departing from the scope of the disclosure.

Figure 6:
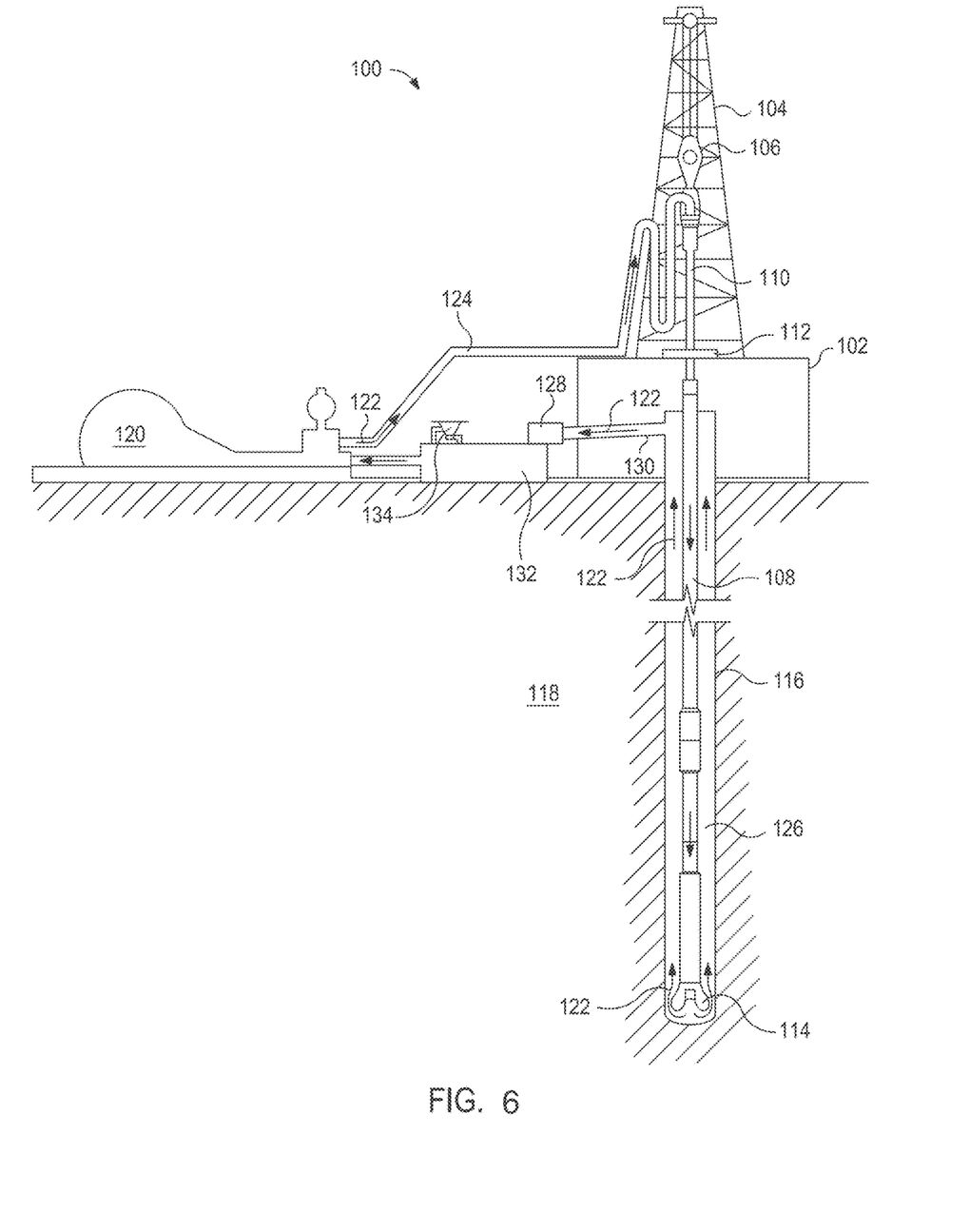
FIG. 6 depicts an embodiment of a system configured for delivering the self-healing cements described herein to a downhole location.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed cement compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed cement compositions may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed cement compositions may be stored, reconditioned, and/or regulated until added to the drilling fluid 122.

As mentioned above, the disclosed cement compositions may directly or indirectly affect the components and equipment of the drilling assembly 100. For example, the disclosed cement compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed cement compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The disclosed cement compositions may also directly or indirectly affect the mixing hopper 134 and the retention pit 132 and their assorted variations.

The disclosed cement compositions may also directly or indirectly affect the various downhole equipment and tools that may come into contact with the cement compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed cement compositions may also directly or indirectly affect any downhole heat exchangers, valves and corresponding actuation devices, tool seals, packers and other wellbore isolation devices or components, and the like associated with the wellbore 116. The disclosed cement compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed cement compositions may also directly or indirectly affect any transport or delivery equipment used to convey the cement compositions to the drilling assembly 100 such as, for example, any transport vessels, conduits, pipelines, trucks, tubulars, and/or pipes used to fluidically move the cement compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Copolymer Synthesis

In an exemplary embodiment, DMAEMA (80 mole %), styrene (18 mole %) and EGDMA (2 mole %) were mixed together in a glass tube and then AIBN (1 mole %) based on total moles of DMAEMA, styrene and EGDMA) was added to the mixture. The polymerization mixture was purged with $N_2$ for 15 minutes and then sealed. The reaction was carried out at 158° F. (70° C.) for 20 hours. The cross-linked polymer was washed with methanol repeatedly, in order to remove unreacted monomer. The copolymer was a white, free flowing powder which may be easily ground to make very fine particles. These particles may be dispersed easily in a cement slurry.

Example 2

Swelling of Copolymer in $CO_2$ Environment

Figure 2A:
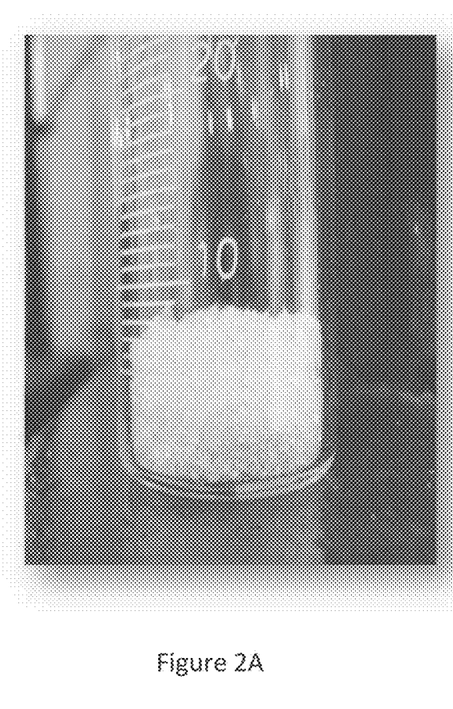
FIGS. 2A,B depict the swelling of a polymer before and after being exposed to $CO_2$.
Figure 2B:
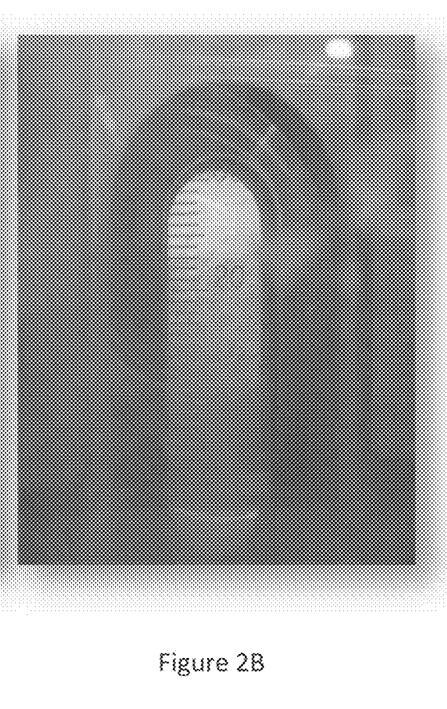

The copolymer above was added to a measuring cylinder (FIG. 2A) and then placed in a see-through autoclave. A measured amount of water was added to it. The temperature in the autoclave was 75° F. After removing the air, $CO_2$ gas was applied and maintained at 700 psi. The swelling of polymer was observed within five minutes in the measuring cylinder (FIG. 2B). It was not possible to measure the extent of swelling quantitatively but almost twice the increase in volume was observed.

Example 3

Swelling of Copolymer in HCl Environment

Figure 3A:
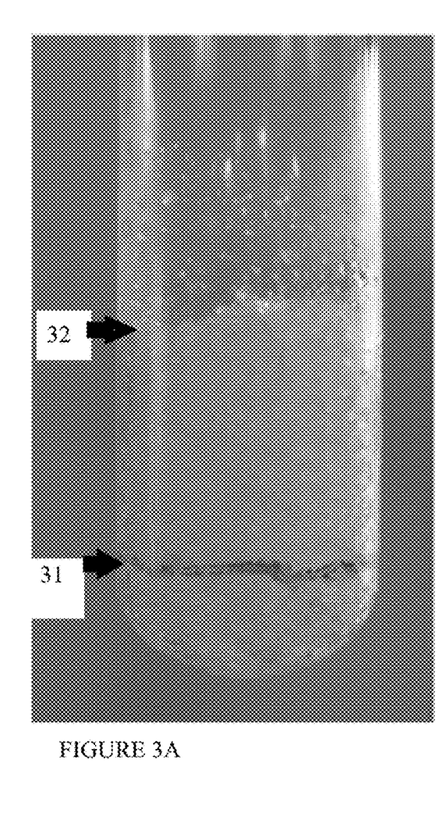
FIGS. 3A,B depict the swelling of a polymer in HCl solution and in only $H_2O$.
Figure 3B:
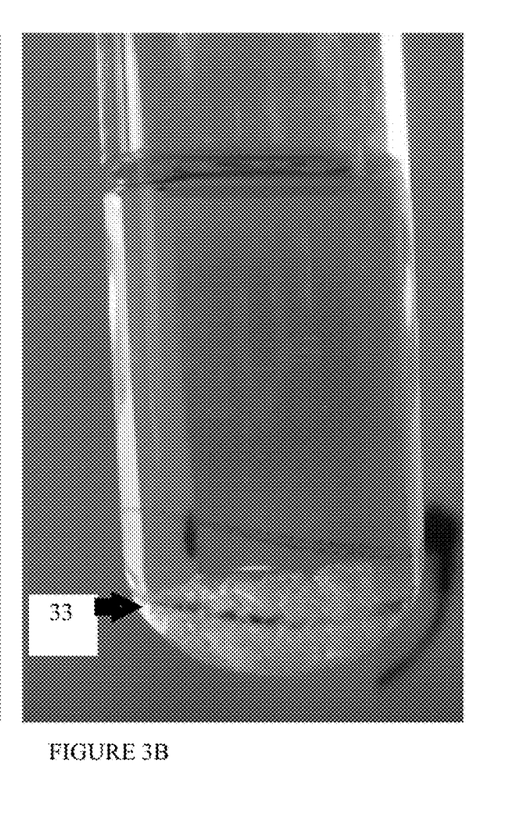

The copolymer was placed in a test tube (FIG. 3A) and then 1 molar solution HCl was added to it at room temperature and pressure. The swelling in the test tube was observed almost instantly. The increase in volume 32 was more than double its initial volume 31. In another test tube the copolymer was mixed with water (FIG. 3B). There was no swelling 33 observed. The lack of swelling may be due to the hydrophobic nature of styrene in the polymer backbone. This also indicates that the polymer swells only in the presence of an acidic environment.

Example 4

Swelling of Cement in HCl Environment

Figure 5A:
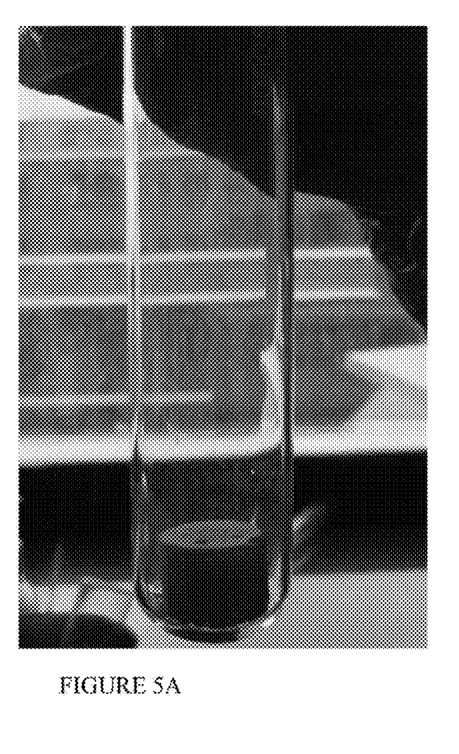
FIGS. 5A,B depict the swelling of a cured cement containing a copolymer in an HCl solution.
Figure 5B:
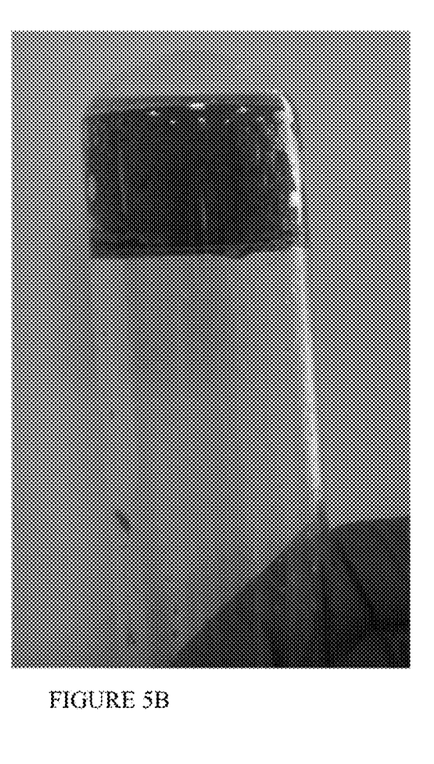

A cement slurry was prepared with 20% loading of the copolymer of the invention. Slurry design: Cement class G: 100%, Polymer: 20% bwoc, FWCA: 0.05% bwoc, D-Air 3000L: 0.05 gal/sk. The cement was cured at 150 F for 48 hours. Then 16 mm diameter piece was cut and kept in a test tube with a 22 mm inner diameter. 1N HCl acid solution was added to the test tube (FIG. 5A). After almost 5 hours the cement swelled and packed in the test tube as shown in FIG. 5B. FWCA™ additive is used to control free water in cements. It also can be used to mildly retard cement slurries and increase slurry viscosity. D-AIR 3000L™ is a defoamer. Both are available from Halliburton Energy Services, Inc., Houston, Tex.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method comprising: introducing a well cementing composition into a wellbore, said cementing composition comprising: a pumpable slurry of cement comprising a copolymer capable of swelling in a gaseous environment, wherein the gaseous environment comprises at least one of $CO_2$, $H_2S$, HCl gas, and combinations thereof; and allowing at least a portion of the cementing composition to cure, with the proviso that the copolymer does not include a fluoro-based polymer.

B: A cementing system comprising: an apparatus configured to: place a cement composition in a wellbore, said cement composition comprising: a pumpable slurry of cement comprising a copolymer capable of swelling in a gaseous environment, wherein the gaseous environment comprises at least one of $CO_2$, $H_2S$, HCl gas, and combinations thereof; and allow at least a portion of the cement composition to set, wherein the cement composition adapts to compensate for changes or faults in the physical structure of the cement after the setting phase of at least a portion of the cement composition, with the proviso that the copolymer does not include a fluoro-based polymer.

C: A composition for well cementing comprising: a pumpable slurry of cement comprising a copolymer capable of swelling in a gaseous environment, wherein the gaseous environment comprises at least one of $CO_2$, $H_2S$, HCl gas, and combinations thereof, with the proviso that the copolymer does not include a fluoro-based polymer.

Each of embodiments A, B and C may have one or more of the following additional elements in any combination: Element 1: wherein the copolymer comprises at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylatestyrene, DMAEMA, EGDMA, methyl methacrylate (MMA), polypropylene, tri vinyl monomers, and combinations thereof. Element 2: wherein the gaseous environment comprises at least one of $H_2S$, HCl gas, and combinations thereof. Element 3: wherein the copolymer comprises styrene in the amount of about 5% to about 25% by weight. Element 4: wherein the copolymer comprises DMAEMA in the amount of about 75% to about 95% by weight. Element 5: wherein the copolymer comprises EGDMA in the amount of about 1% to about 3% by weight. Element 6: further comprising allowing the cured cement to self-heal to compensate for changes or faults in the physical structure of the cement after the setting phase of the cement composition. Element 7: wherein the self-healing comprises swelling in a gaseous environment, thereby blocking the migration of fluids, gases, and combinations thereof. Element 8: wherein the changes or faults are cracks due to physical stresses, chemical attack, formation creep, and combinations thereof. Element 10: wherein the cement composition adapts its structure after the setting phase of at least a portion of the cement. Element 11: wherein the cement composition adapts by self-healing. Element 12:

wherein the self-healing comprises swelling in a gaseous environment, thereby blocking the migration of fluids, gases, and combinations thereof. Element 13: wherein the changes or faults are cracks due to physical stresses, chemical attack, formation creep, and combinations thereof. Element 14: wherein the gaseous environment comprises at least one of $H_2S$, $CO_2$, and combinations thereof. Element 15: wherein the gaseous environment comprises at least one of $CO_2$, HCl gas, and combinations thereof. Element 16: wherein the gaseous environment comprises $H_2S$. Element 17: wherein the gaseous environment comprises HCl gas. Element 18: wherein the gaseous environment comprises $CO_2$.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
introducing a well cementing composition into a wellbore, the well cementing composition comprising:
a pumpable slurry of cement comprising a copolymer capable of swelling on contact with at least one gas selected from the group consisting of hydrogen sulfide gas, hydrogen chloride gas, carbon dioxide gas, and combinations thereof, wherein the copolymer does not include a fluoro-based monomer,
curing at least a portion of the well cementing composition to form a cured cement;
contacting the copolymer with the hydrogen sulfide gas, the hydrogen chloride gas, the carbon dioxide gas, or combinations thereof; and
swelling the copolymer due to contact with the gas.

2. The method of claim 1, wherein the copolymer comprises at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylatestyrene, DMAEMA, EGDMA, methyl methacrylate (MMA), polypropylene, tri vinyl monomers, and combinations thereof.

3. The method of claim 1, wherein the copolymer comprises styrene monomer in the amount of about 5% to about 25% by weight.

4. The method of claim 1, wherein the copolymer comprises DMAEMA in the amount of about 75% to about 95% by weight.

5. The method of claim 1, wherein the copolymer comprises EGDMA in the amount of about 1% to about 3% by weight.

6. The method of claim 1, further comprising allowing the cured cement to self-heal to compensate for changes or faults in a physical structure of the cured cement.

7. The method of claim 6, wherein the self-healing comprises the swelling of the copolymer on contact with at least one gas selected from the group consisting of hydrogen sulfide gas, hydrogen chloride gas, carbon dioxide gas, and combinations thereof, thereby blocking migration of fluids, gases, and combinations thereof.

8. The method of claim 6, wherein the changes or faults are cracks due to physical stresses, chemical attack, formation creep, and combinations thereof.

9. A cementing system comprising:
an apparatus configured to:
place a cement composition in a wellbore, said cement composition comprising:
a pumpable slurry of cement comprising a copolymer capable of swelling due to contact with at least one gas selected from the group consisting of hydrogen sulfide gas, hydrogen chloride gas, carbon dioxide, and combinations thereof, wherein the copolymer does not include a fluoro-based monomer, wherein the gaseous environment comprises at least one of $CO_2$, $H_2S$, HCl gas, and combinations thereof,
wherein the cement composition is capable of curing to form a cured cement, and wherein the cured cement is capable of adapting to compensate for changes or faults in a physical structure of the cured cement.

10. The system of claim 9, wherein the cured cement adapts by self-healing.

11. The system of claim 10, wherein the self-healing comprises swelling the copolymer on contact with at least one gas selected from the group consisting of hydrogen sulfide gas, hydrogen chloride gas, carbon dioxide gas, and combinations thereof, thereby blocking migration of fluids, gases, and combinations thereof.

12. The system of claim 9, wherein the changes or faults are cracks due to physical stresses, chemical attack, formation creep, and combinations thereof.

13. The system of claim 9, wherein the copolymer comprises at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylate, styrene, DMAEMA, EGDMA, methyl methacrylate (MMA), polypropylene, tri vinyl monomers, and combinations thereof.

14. A composition for well cementing comprising:
a pumpable slurry of cement comprising a copolymer capable of swelling due to contact with at least one gas selected from the group consisting of hydrogen sulfide gas, hydrogen chloride gas, carbon dioxide, and combinations thereof, wherein the copolymer does not include a fluoro-based polymer.

15. The composition of claim 14, wherein the copolymer comprises at least two of the following monomers: alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, vinyl acetate, alkane diol diacrylates, alkane diol dimethacrylates, alkene glycol diacrylates, alkene glycol dimethacrylates, alkane diol divinyl ethers, alkene glycol divinylethers, divinylbenzene, allyl methacrylate, allyl acrylatestyrene, DMAEMA, EGDMA, methyl methacrylate (MMA), polypropylene, tri vinyl monomers, and combinations thereof.

16. The composition of claim 14, wherein the copolymer comprises styrene in the amount of about 5% to about 25% by weight.

17. The composition of claim 14, wherein the copolymer comprises DMAEMA in the amount of about 75% to about 95% by weight.

\* \* \* \* \*